United States Patent
Solowiej

(10) Patent No.: US 9,833,693 B1
(45) Date of Patent: Dec. 5, 2017

(54) BOTTLE PUZZLE

(71) Applicant: Henry E. Solowiej, Costa Mesa, CA (US)

(72) Inventor: Henry E. Solowiej, Costa Mesa, CA (US)

( * ) Notice: Subject to any disclaimer, the term of this patent is extended or adjusted under 35 U.S.C. 154(b) by 0 days.

(21) Appl. No.: 15/454,226

(22) Filed: Mar. 9, 2017

(51) Int. Cl.
*A63F 9/12* (2006.01)
*A63H 33/08* (2006.01)
*G09B 19/00* (2006.01)

(52) U.S. Cl.
CPC .......... *A63F 9/1208* (2013.01); *A63H 33/08* (2013.01); *G09B 19/003* (2013.01)

(58) Field of Classification Search
CPC .... A63F 9/1208; A63F 9/1204; A63F 9/1236; A63F 9/1288; A63H 33/08; G09B 19/003; B65D 1/02; B65D 1/04
USPC ........................................................ D21/479
See application file for complete search history.

(56) References Cited

U.S. PATENT DOCUMENTS

| | | | |
|---|---|---|---|
| 4,940,153 A * | 7/1990 | Pilgrim, Jr. ............... | B44C 1/10 156/63 |
| 4,958,740 A | 9/1990 | Wilkerson | |
| 5,823,531 A * | 10/1998 | Huber ................... | A63F 9/1208 273/156 |
| 7,021,625 B2 | 4/2006 | Simmons | |
| 7,252,204 B1 | 8/2007 | Small | |
| 7,490,831 B2 | 2/2009 | Simmons | |
| 8,746,475 B2 * | 6/2014 | Kountotsis ............... | B65D 1/04 215/396 |
| 2003/0173738 A1* | 9/2003 | Simmons ................ | A63F 9/001 273/157 R |
| 2006/0243623 A1* | 11/2006 | Vachon .................. | B65D 55/14 206/446 |
| 2009/0218765 A1* | 9/2009 | Paquette ............... | A63F 9/0838 273/153 S |

FOREIGN PATENT DOCUMENTS

CN 2825517 Y * 10/2006
WO WO 2017075762 A1 * 5/2017 ............... A63F 9/12

* cited by examiner

*Primary Examiner* — Steven Wong
(74) *Attorney, Agent, or Firm* — Vladi Khiterer

(57) ABSTRACT

A bottle puzzle used as a training or learning tool for children and adults with cognitive disabilities has puzzle pieces with uniquely shaped concave and convex walls, with only one wall in one puzzle piece matching another wall in a different puzzle piece. Each puzzle piece is a fully contained compartment capable of holding and dispensing beverages. When the puzzle pieces are put together, they form a normal bottle that can be filled with beverages.

3 Claims, 5 Drawing Sheets

BOTTLE PUZZLE

FIELD OF THE INVENTION

The present invention pertains to the field of puzzles, and more particularly to the field of three dimensional puzzles used as training or learning tools for children and adults with cognitive disabilities.

BACKGROUND OF THE INVENTION

It has been known for quite some time that "brain teaser" and "put together" types puzzles are superb learning tools for children and adults with learning or cognitive disabilities. Not only such puzzles sharpen focus and increase problem solving ability, they also improve fine motor skills, cognitive matching skills and enable simple compliance tasks. Most such puzzles of the prior art do not amount to practical or useful items upon completion of the puzzle. Rather, most puzzles of the prior art are viewed and treated as toys. It is, however, useful to have a puzzle that rewards a child or an adult with cognitive disabilities with a tangible result of their effort of putting the puzzle together. What is needed, therefore, is a puzzle that would encourage participation in the puzzle put together activities and even develop attachment to the puzzle by virtue of being a practical and useful item upon completion of the puzzle.

SUMMARY OF THE INVENTION

The present invention satisfies this need. The bottle puzzle according to this invention comprises a plurality of puzzle pieces each comprising uniquely shaped concave and convex walls with only one wall in one puzzle piece matching another wall in a different puzzle piece. Each puzzle piece comprises a fully contained compartment capable of holding and dispensing beverages. When the puzzle pieces are put together, they form a normal bottle that can be filled with one or more beverages and carried by a child or an adult with a cognitive disability after the completion of the puzzle.

BRIEF DESCRIPTION OF THE DRAWING FIGURES

DETAILED DESCRIPTION OF THE PREFERRED EMBODIMENT

Figure 1:
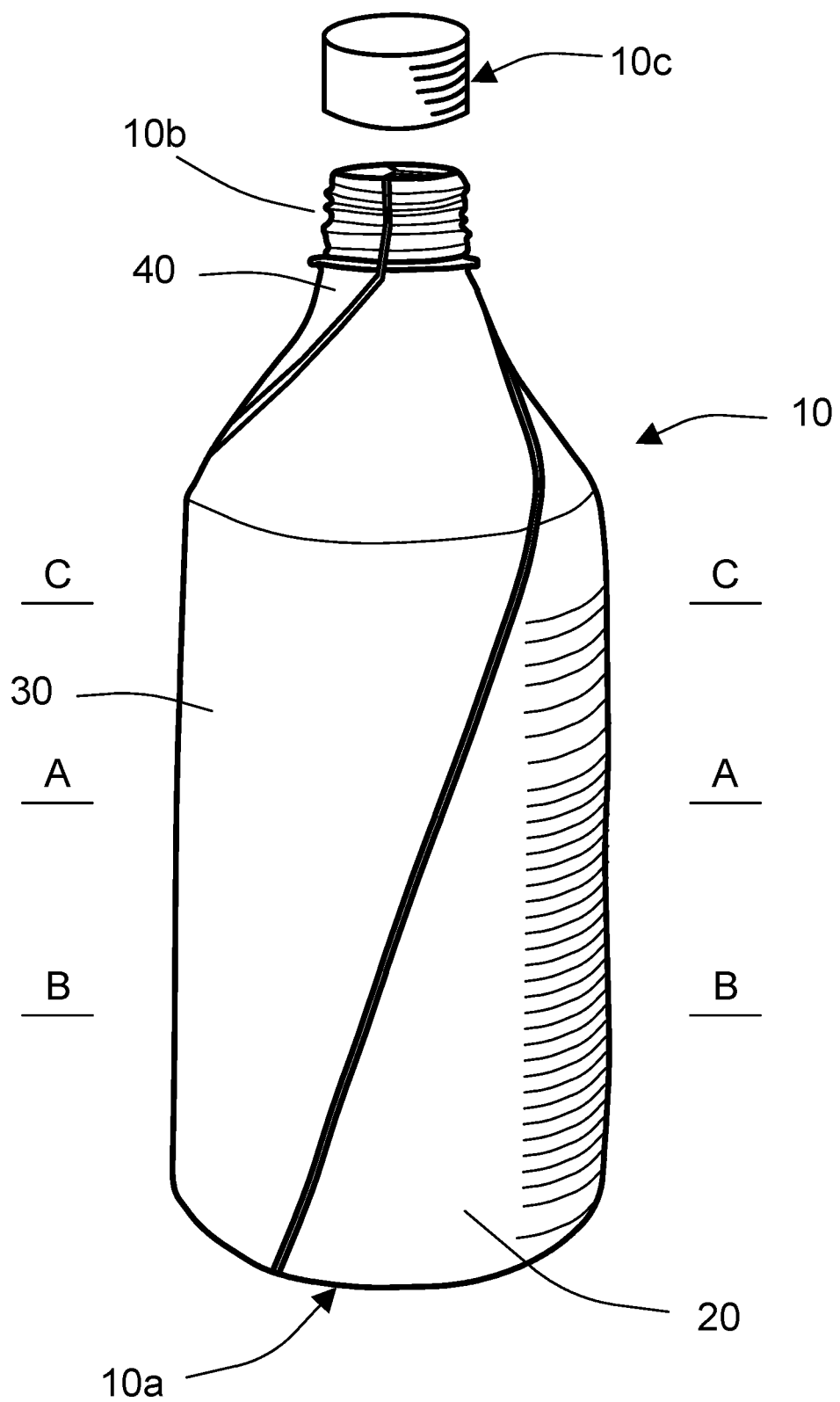
FIG. 1 shows an isometric view of a bottle puzzle according to the preferred embodiment of this invention with the puzzle pieces put together.
Figure 2:
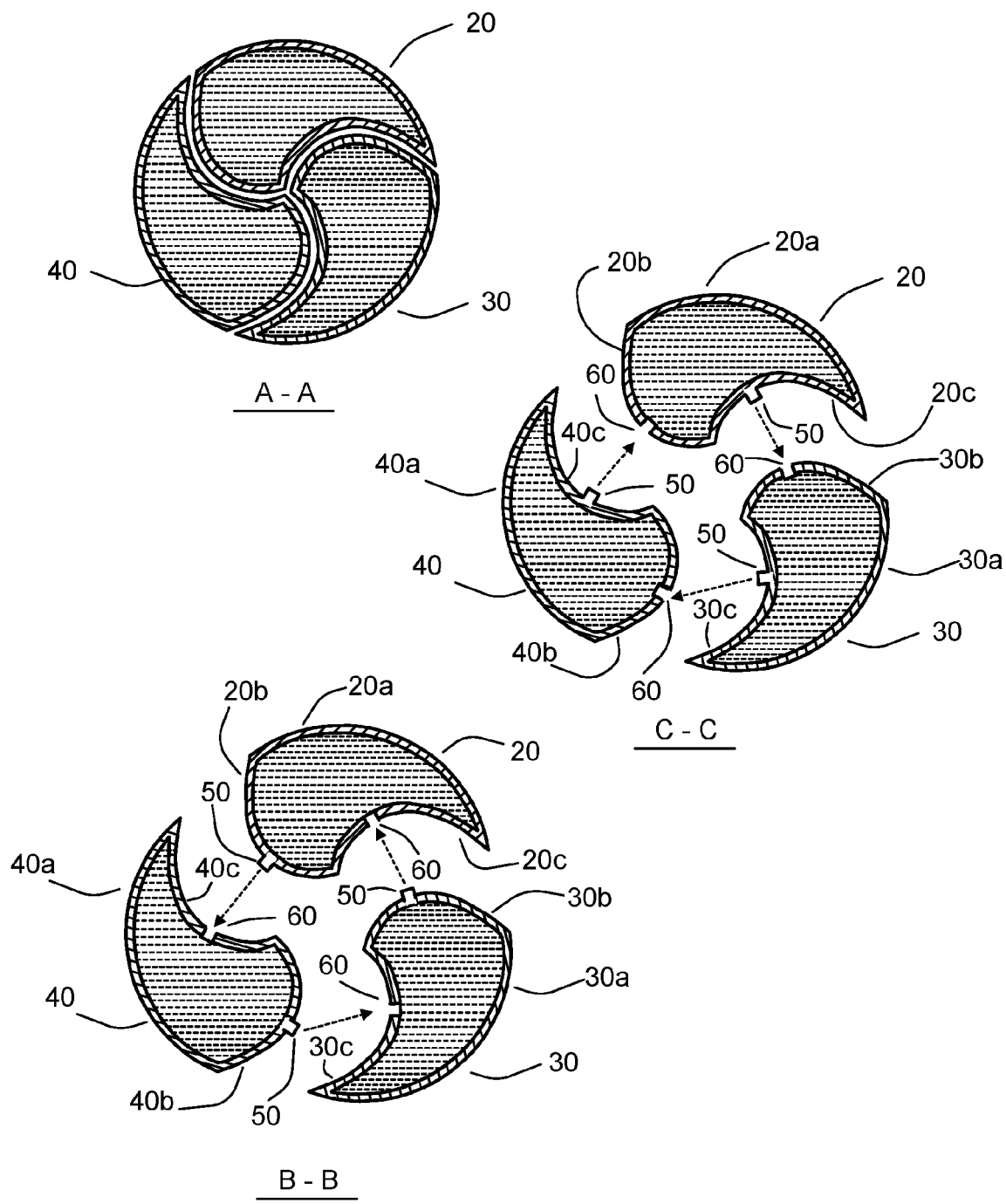
FIG. 2 shows three cross sectional views of the bottle puzzle according to the preferred embodiment of this invention with one cross sectional view having the puzzle pieces put together and two cross sectional views with the puzzle pieces spread apart.
Figure 3:
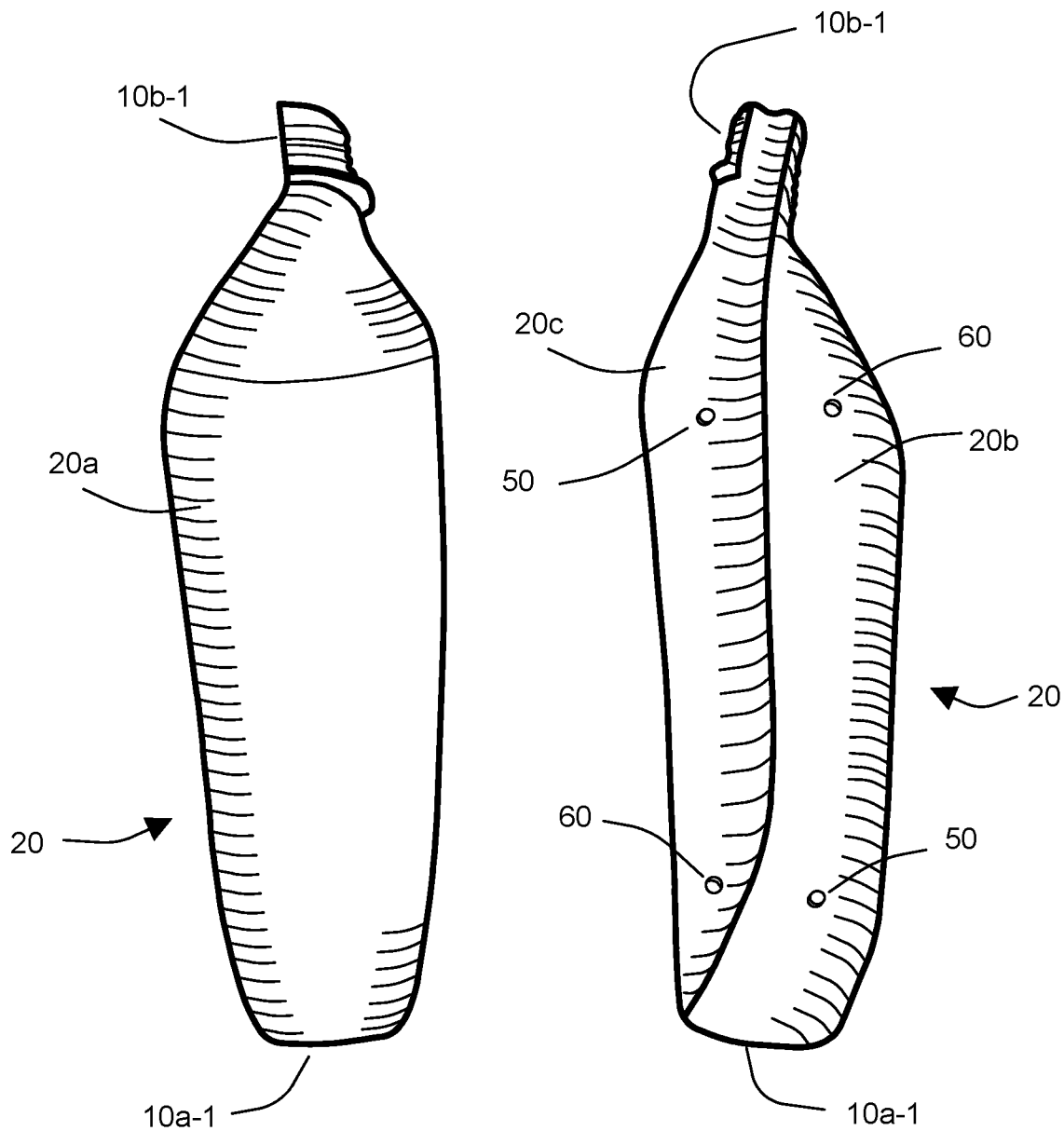
FIG. 3 shows isometric views of the same first puzzle piece from two perspectives.
Figure 4:
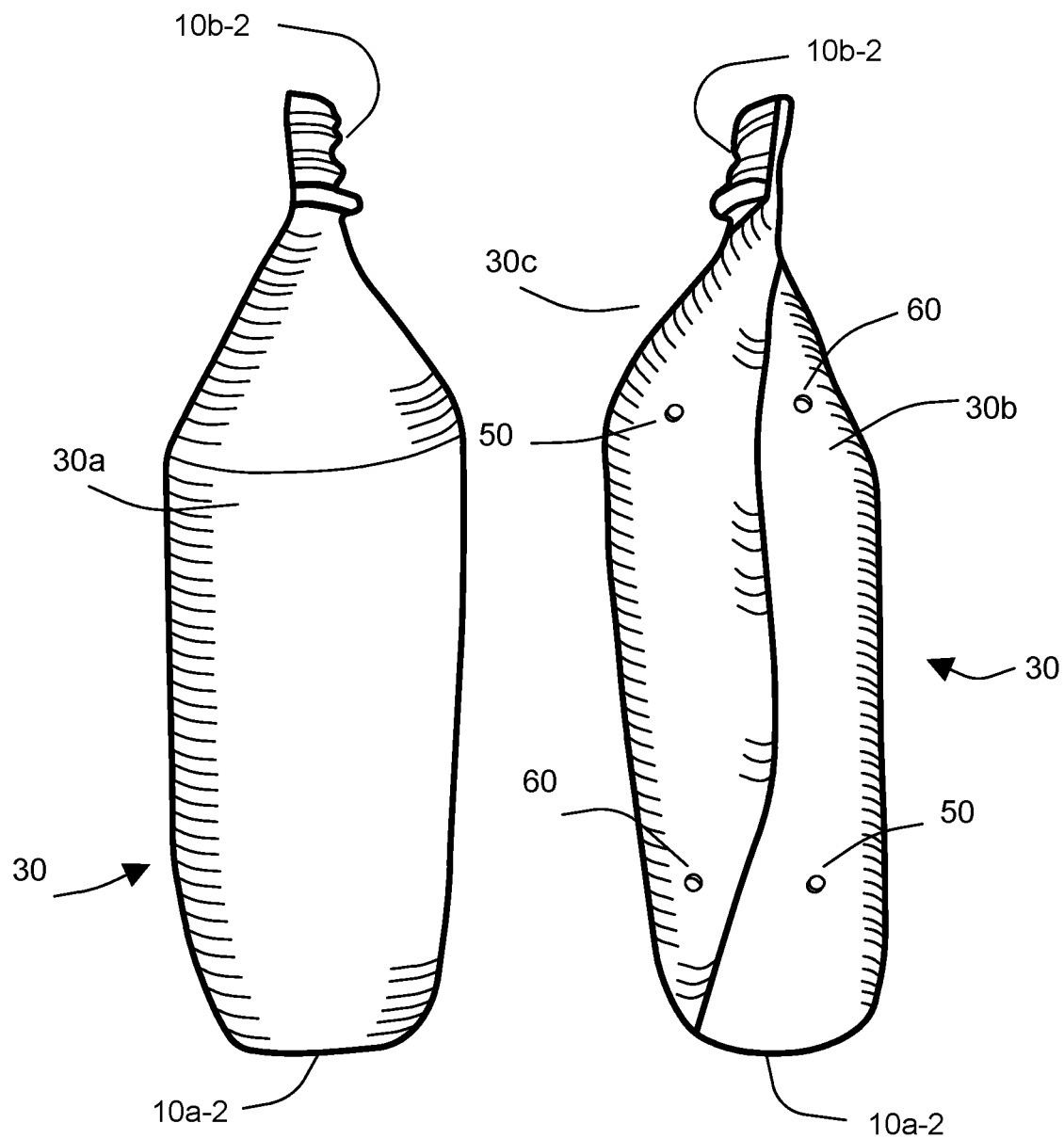
FIG. 4 shows isometric views of the same second puzzle piece from two perspectives.
Figure 5:
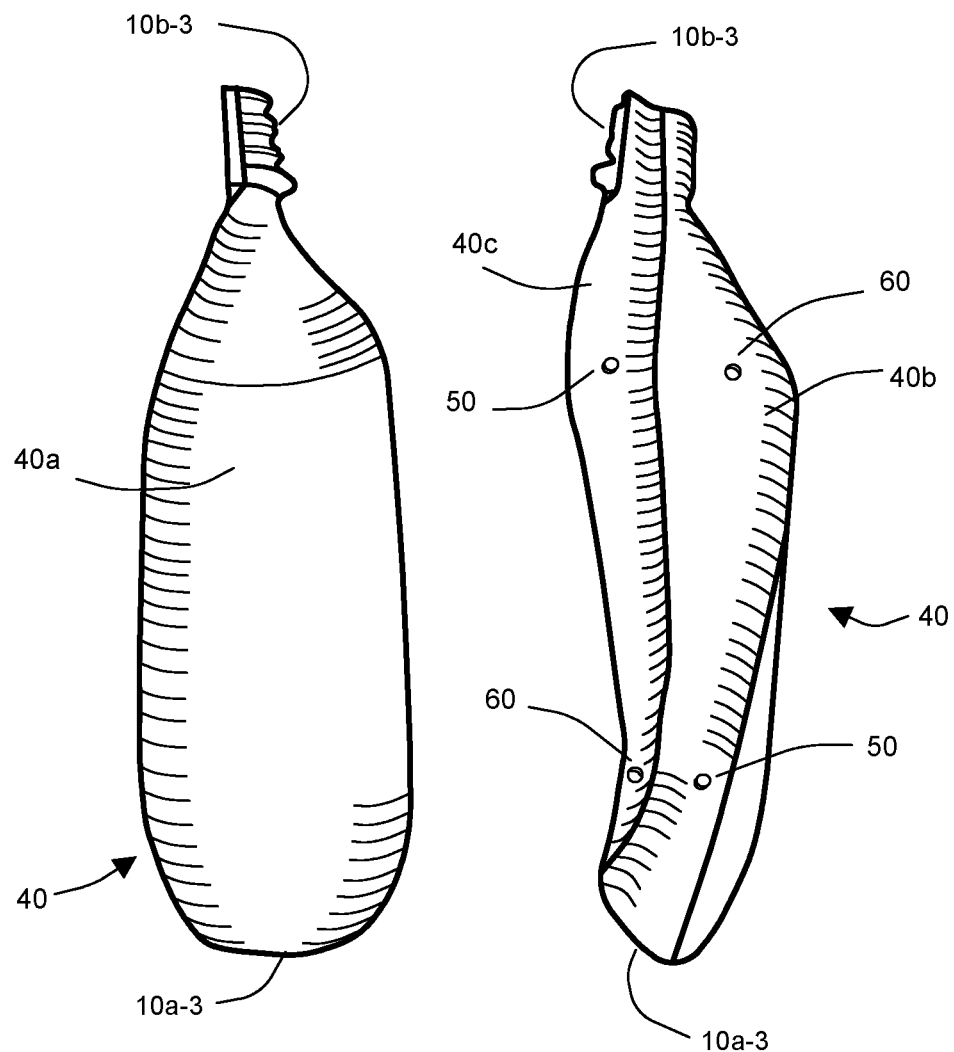
FIG. 5 shows isometric views of the same third puzzle piece from two perspectives.

This invention will be better understood with the reference to FIG. 1 through FIG. 5. The same numerals indicate the same elements in all drawing figures.

Viewing, simultaneously, FIG. 1 through FIG. 5, numeral 10 indicates a bottle. Bottle 10 comprises a plurality of puzzle pieces. In the preferred embodiment shown in reference to FIG. 1 through FIG. 5, only three puzzle pieces indicated by numerals 20, 30 and 40 are shown. However, a larger number of puzzle pieces can be used.

Puzzle piece 20 comprises an exterior wall indicated by numeral 20a, a first inner wall indicated by numeral 20b, a second inner wall indicated by numeral 20c, a bottom wall indicted by numeral 10a-1 and a partial neck portion indicated by numeral 10b-1.

Puzzle piece 30 comprises an exterior wall indicated by numeral 30a, a first inner wall indicated by numeral 30b, a second inner wall indicated by numeral 30c, a bottom wall indicted by numeral 10a-2 and a partial neck portion indicated by numeral 10b-2.

Puzzle piece 40 comprises an exterior wall indicated by numeral 40a, a first inner wall indicated by numeral 40b, a second inner wall indicated by numeral 40c, a bottom wall indicted by numeral 10a-3 and a partial neck portion indicated by numeral 10b-3.

Puzzle pieces 20, 30 and 40 detachably assemble to one another to form bottle 10. Bottle 10 comprises a closed bottom indicated by numeral 10a, a substantially cylindrical body formed by exterior walls 20a, 30a and 40a, extending from closed bottom 10a and terminating in a threaded neck indicated by numeral 10b. Threaded neck 10b receives a cap indicated by numeral 10c.

Puzzle pieces 20, 30 and 40 form fully enclosed compartments capable of holding beverages and dispensing them through threaded neck 10b.

First inner wall 20b comprises a uniquely shaped convex surface with a helical twist. Second inner wall 20c comprises a uniquely shaped concave surface with a helical twist. First inner wall 30b comprises a uniquely shaped convex surface with a helical twist. Second inner wall 30c comprises a uniquely shaped concave surface with a helical twist. First inner wall 40b comprises a uniquely shaped convex surface with a helical twist. Second inner wall 40c comprises a uniquely shaped concave surface with a helical twist.

First inner walls 20b, 30b and 30b of each puzzle piece 20, 30 and 40 coincides and engages with only one second inner wall 20c, 30c and 40c of another puzzle piece. Specifically, first inner wall 20b coincides and engages with only second inner wall 40c. First inner wall 30b coincides and engages with only second inner wall 20c. First inner wall 40b coincides and engages with only second inner wall 30c. Attempting to match any other combination of first inner walls 20b, 30b and 30b with second inner walls 20c, 30c and 40c will not work. Accordingly, putting together bottle 10 out of puzzle pieces 20, 30 and 40 requires matching the correct combinations of first inner walls 20b, 30b and 30b with second inner walls 20c, 30c and 40c.

Bottle 10 further comprises attachment means disposed in the coinciding first inner walls 20b, 30b and 30b and second inner walls 20c, 30c and 40c. A variety of attachment means can be used to latch puzzle pieces 20, 30 and 40 together, including Velcro, double sided sticky tape, rubber bands, magnets.

In the preferred embodiment shown with reference to FIG. 1 through FIG. 5, the attachment means comprises at least one raised male interlock portion indicated by numeral 50 and at least one recessed mating female interlock portion indicated by numeral 60. First inner walls 20b, 30b and 30b and second inner walls 20c, 30c and 40c are shown to have two such attachment means. Viewing specifically FIG. 1 and FIG. 2, the cross section C-C cuts through and shows the following: Recessed mating female interlock portion 60 disposed in first inner wall 30b engages and latches with raised male interlock portion 50 disposed in second inner wall 20c. Recessed mating female interlock portion 60 disposed in first inner wall 40b engages and latches with raised male interlock portion 50 disposed in second inner wall 30c. Recessed mating female interlock portion 60 disposed in first inner wall 20b engages and latches with raised male interlock portion 50 disposed in second inner wall 40c.

The cross section B-B cuts through and shows the following: Recessed mating female interlock portion 60 disposed in second inner wall 20c engages and latches with raised male interlock portion 50 disposed in first inner wall 30b. Recessed mating female interlock portion 60 disposed in second inner wall 30c engages and latches with raised male interlock portion 50 disposed in first inner wall 40b. Recessed mating female interlock portion 60 disposed in second inner wall 40c engages and latches with raised male interlock portion 50 disposed in first inner wall 20b.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

I claim:

1. A bottle puzzle comprising a plurality of puzzle pieces, each puzzle piece comprising an exterior wall, a first inner wall, a second inner wall, a bottom wall and a partial neck portion, for detachably assembling the puzzle pieces to one another to form a bottle comprising a closed bottom, a substantially cylindrical body extending from the closed bottom and terminating in a threaded neck receiving a cap, a plurality of compartments formed by the puzzle pieces capable of holding beverages and dispensing them through the threaded neck;

whereas, each first inner wall comprising a uniquely shaped convex surface with a helical twist and each second inner wall comprising a uniquely shaped concave surface with a helical twist, such that each first inner wall of each puzzle piece coinciding and engaging with only one second inner wall of another puzzle piece.

2. A bottle puzzle as in claim 1 further comprising attachment means disposed in the coinciding first and second inner walls.

3. A bottle puzzle as in claim 2, wherein the attachment means comprises at least one raised male interlock portion and at least one recessed mating female interlock portion engaging and latching with the male interlock portion.

\* \* \* \* \*